United States Patent
Schimanowski et al.

(10) Patent No.: US 9,227,728 B2
(45) Date of Patent: Jan. 5, 2016

(54) AIRCRAFT CABIN PARTITION MONUMENT WITH STOWAGE COMPARTMENT

(71) Applicant: Airbus Operations GmbH, Hamburg (DE)

(72) Inventors: Alex Schimanowski, Hamburg (DE); Soenke Jacobsen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/470,175

(22) Filed: Aug. 27, 2014

(65) Prior Publication Data

US 2015/0069891 A1 Mar. 12, 2015

(30) Foreign Application Priority Data

Sep. 11, 2013 (EP) .................................... 13183923

(51) Int. Cl.
- *B64D 13/00* (2006.01)
- *B64D 11/00* (2006.01)
- *B64D 11/04* (2006.01)

(52) U.S. Cl.
CPC ............ *B64D 11/0023* (2013.01); *B64D 11/04* (2013.01); *B64D 2011/0046* (2013.01)

(58) Field of Classification Search
CPC ....................................................... Y02T 50/46
USPC ....................................................... 244/118.5
See application file for complete search history.

(56) References Cited

U.S. PATENT DOCUMENTS

| | | | | |
|---|---|---|---|---|
| 3,701,396 A * | 10/1972 | House | ..................... | B62B 5/049 188/21 |
| 4,055,317 A * | 10/1977 | Greiss | ..................... | B64D 11/00 244/118.5 |
| 5,074,496 A * | 12/1991 | Rezag | ..................... | B65G 1/0407 105/327 |
| 5,322,244 A * | 6/1994 | Dallmann | ............... | B64D 11/04 244/118.1 |
| 6,488,234 B2 * | 12/2002 | Li | ..................... | B64D 11/0007 186/40 |
| 7,494,091 B2 * | 2/2009 | Harrington | ........ | B64D 11/0007 212/312 |
| 7,780,114 B2 * | 8/2010 | Doebertin | .............. | B64D 11/04 244/118.5 |
| 8,152,102 B2 * | 4/2012 | Warner | .................. | B64D 11/00 244/118.2 |
| 8,387,916 B2 * | 3/2013 | Baatz | ................. | B64D 11/0007 244/118.1 |
| 9,010,686 B2 * | 4/2015 | Saint-Jalmes | .......... | B64D 11/00 244/118.1 |
| 2010/0243801 A1 | 9/2010 | Saint-Jalmes et al. | | |
| 2012/0032026 A1 | 2/2012 | Becker et al. | | |
| 2012/0248245 A1 * | 10/2012 | Schliwa | ................. | B61D 35/00 244/118.5 |
| 2013/0076214 A1 * | 3/2013 | Chamberlin | ......... | A47B 96/025 312/107 |

FOREIGN PATENT DOCUMENTS

| | | |
|---|---|---|
| DE | 102006023047 | 11/2007 |
| DE | 102011116519 | 4/2013 |

OTHER PUBLICATIONS

European Search Report, Feb. 24, 2014.

\* cited by examiner

*Primary Examiner* — Brian M O'Hara
*Assistant Examiner* — Keith L Dixon
(74) *Attorney, Agent, or Firm* — Greer, Burns & Crain, Ltd.

(57) ABSTRACT

An aircraft cabin partition monument comprising a partition wall element and a stowage compartment. The stowage compartment includes a cover plate element and at least one sidewall element. The stowage compartment is convertible between a state of rest, wherein the cover plate and the sidewall element extend substantially parallel to the partition wall element, and a state of operation, wherein the cover plate element and the sidewall element extend relative to the partition wall element such that the cover plate element and the sidewall element define a stowage space arranged adjacent to the partition wall element.

19 Claims, 3 Drawing Sheets

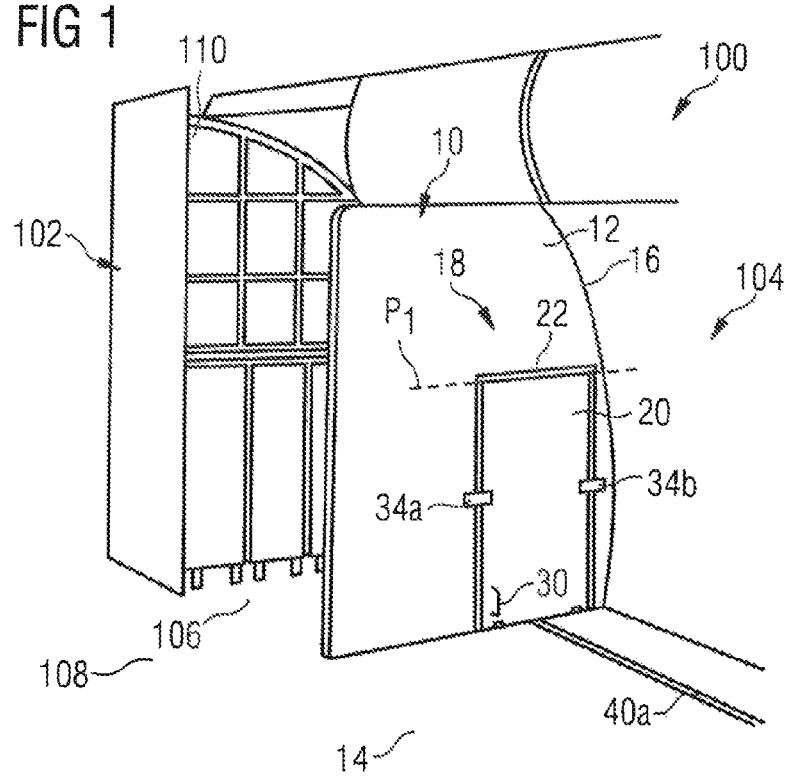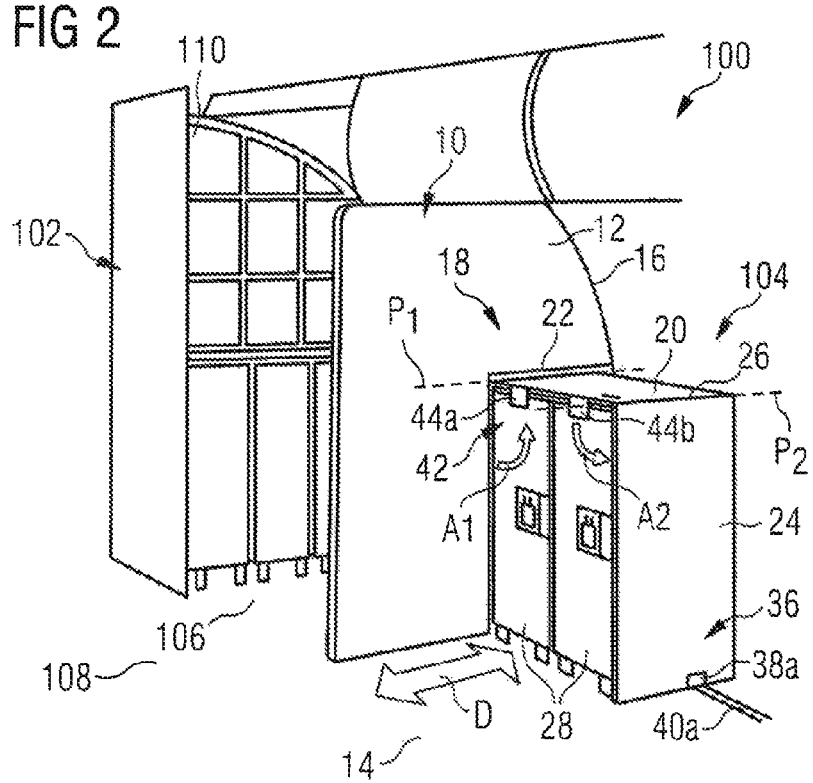

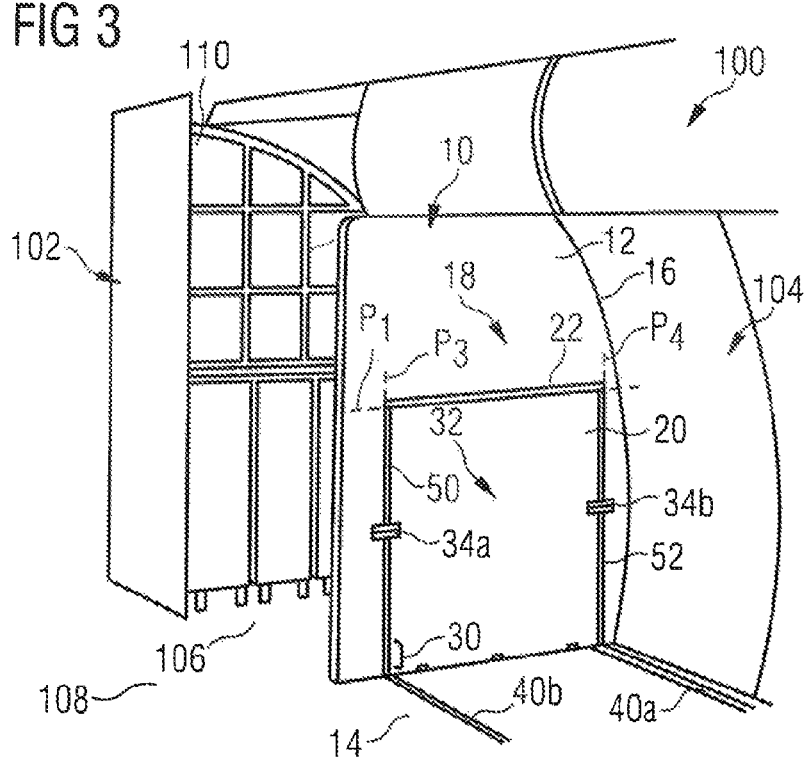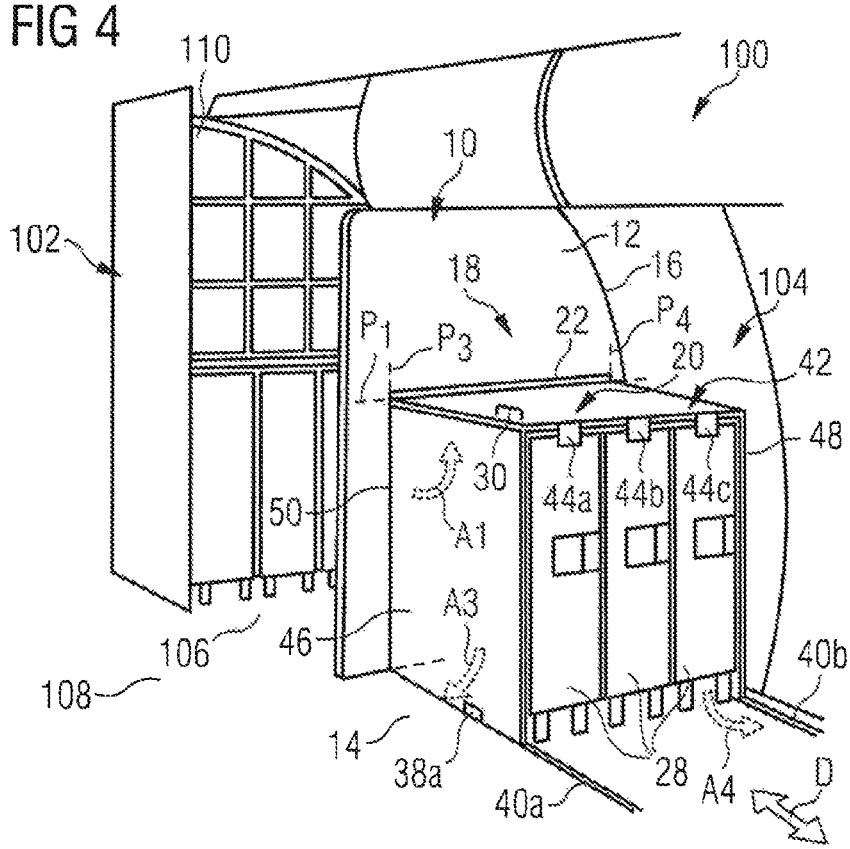

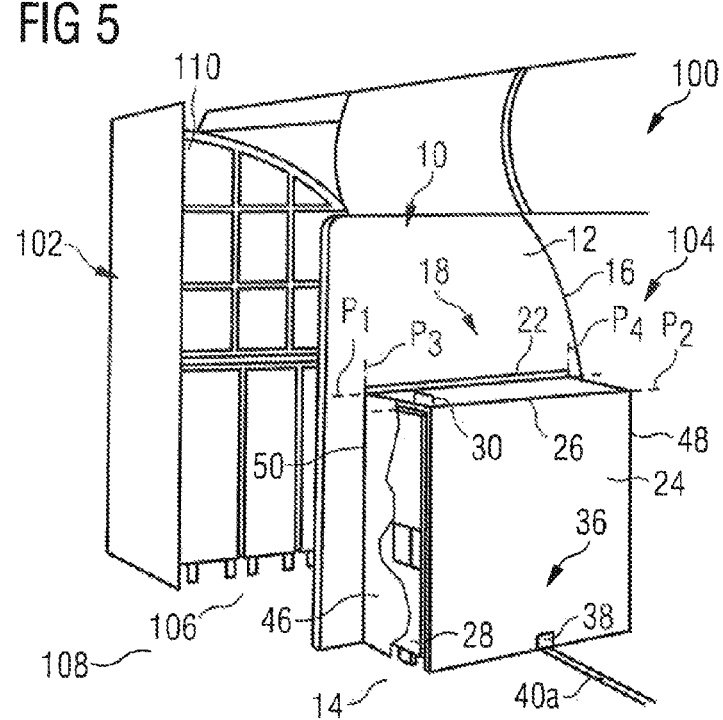
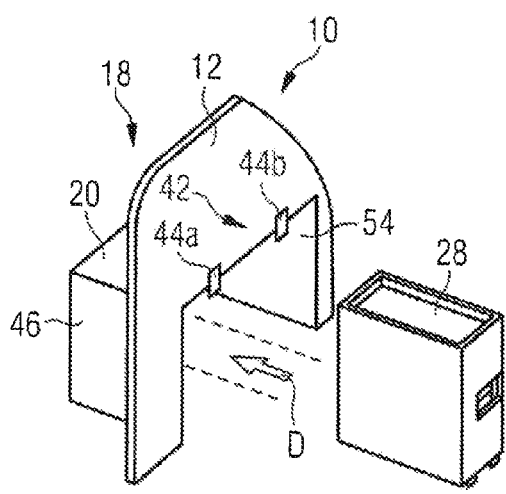
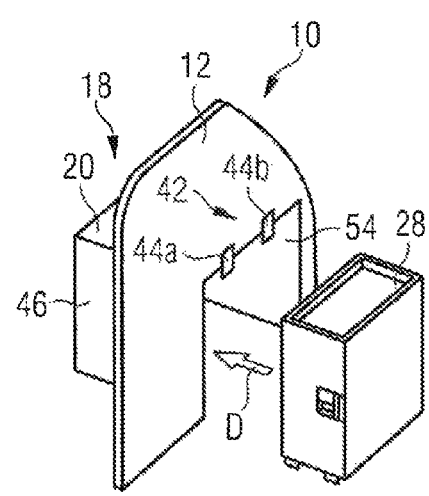

AIRCRAFT CABIN PARTITION MONUMENT WITH STOWAGE COMPARTMENT

CROSS-REFERENCES TO RELATED APPLICATIONS

This application claims the benefit of the European patent application No. 13183923.5 filed on Sep. 11, 2013, the entire disclosures of which are incorporated herein by way of reference.

BACKGROUND OF THE INVENTION

The invention relates to an aircraft cabin partition monument comprising a stowage compartment. The invention further relates to a method of operating an aircraft cabin partition monument of this kind and to an aircraft area comprising an aircraft cabin partition monument of this kind.

In a modern passenger aircraft, trolleys loaded with items to be supplied to passengers on board the aircraft usually are accommodated in a galley which is located next to aircraft doors and adjacent to an aisle and a passageway in an entrance area of the aircraft. DE 10 2006 023 047 B4 or U.S. Pat. No. 7,780,114 B2 describes an aircraft galley comprising a trolley stowage which is arranged in a section of the galley adjacent to a floor of the aircraft cabin and which is suitable to accommodate a predetermined number of trolleys. The galley layout and the size of the trolley stowage is adapted to the cabin layout, i.e., to the maximum number of passengers on board the aircraft, and the space requirements for the passageway and the aisle extending adjacent to the galley.

In the operation of modern passenger aircraft, cabin layout flexibility becomes more and more important, since it may be economically worthwhile for an airline to operate the aircraft at certain times, e.g., during the holiday period, with a greater number of economy class seats and at other times, e.g., outside the holiday period, with a greater number of business class seats. Moreover, it may be desirable for an airline to vary the total number of seats in the aircraft passenger cabin depending on the utilization or route, for example. An optimization of the aircraft utilization therefore requires not only a positioning of the passenger seats and a division of the aircraft passenger cabin into a business class area and an economy class area as flexibly as possible, but also an adjustment of the number of trolleys to the varying number of passengers on board the aircraft.

SUMMARY OF THE INVENTION

The invention is directed at the object of providing an aircraft cabin partition monument which allows an easy adjustment of the trolley accommodation capability of an aircraft cabin to a varying number of passengers on board the aircraft. The invention further is directed at the object of providing a method of operating an aircraft cabin partition monument of this kind. Finally, the invention is directed at the object of providing an aircraft area comprising an aircraft cabin partition monument of this kind.

An aircraft cabin partition monument according to the invention comprises a partition wall element. The partition wall element may be a substantially plate shaped element which is adapted to be mounted to a floor and/or a sidewall of an aircraft cabin so as to separate a first aircraft cabin region from a second aircraft cabin region. Further, the aircraft cabin partition monument comprises a stowage compartment including a cover plate element and at least one sidewall element. The stowage element is convertible between a state of rest and a state of operation. In the state of rest of the stowage compartment, the cover plate element and the sidewall element extend substantially parallel to the partition wall element.

In the state of operation of the stowage compartment, the cover plate element and the sidewall element extend relative to the partition wall element such that the cover plate element and the sidewall element define a stowage space. The stowage space is arranged adjacent to the partition wall element, but not necessarily is limited by the partition wall element. Instead, in the context of the present application, the expression "arranged adjacent to the partition wall element" should also describe an arrangement, wherein the stowage space is arranged adjacent to an opening formed in the partition wall element.

The stowage space made available in the state of operation of the stowage compartment may be adapted to be used for several purposes. For example, the stowage space may be suitable for accommodating a wheelchair, coats or pet transportation cages. As an alternative, it is also conceivable to use the stowage space provided by the stowage compartment as a crew rest possibility. In a preferred embodiment of the aircraft cabin partition monument, the stowage compartment, however, is sized and shaped so as to be suitable to accommodate at least one trolley which may be loaded with items to be supplied to passengers on board the aircraft. Hence, the aircraft cabin partition monument provides a stowage compartment which, in its state of rest, requires only a small installation space, but which provides considerable stowage space on demand. In particular, in case the stowage space defined by the stowage compartment is suitable to accommodate trolleys, the aircraft cabin partition monument allows a particularly easy adjustment of the trolley stowage capacity within an aircraft cabin to the needs of varying numbers of passengers on board the aircraft, in particular in case of a change of the layout of the aircraft cabin.

The cover plate element of the stowage compartment may be pivotably connected to the partition wall element. For example, the cover plate element may be attached to the stowage compartment via a suitable hinge mechanism so as to be pivotable relative to the partition wall element about a pivot axis which extends along an edge of the cover plate element facing the partition wall element substantially parallel to the partition wall element. In the state of operation of the stowage compartment, the cover plate element preferably extends substantially perpendicular to the partition wall element. When the stowage compartment is in its state of operation, the cover plate element then may be used for different additional stowage options, for example as a coat rack or magazine rack, or as an additional working surface for the cabin crew.

A first sidewall element of the stowage compartment may be pivotably connected to the cover plate. A first sidewall element which is pivotably connected to the cover plate element preferably is not directly connected to the partition wall element. Instead, the first sidewall element may be pivotably connected to an edge of the cover plate element, for example by means of a suitable hinge arrangement, which faces away from the partition wall element when the stowage compartment is in its state of operation and the cover plate element extends substantially perpendicular to the partition wall element. The first sidewall element then may be pivotable about a pivot axis extending along an edge of the sidewall element which faces the cover plate element and which, in the state of operation of the stowage compartment, extends substantially parallel to the partition wall element at a distance which is defined by the dimensions of the cover plate element.

In the state of operation of the stowage compartment, the first sidewall element preferably extends substantially perpendicular to the cover plate element and hence may serve to support the cover plate element in a position perpendicular to the partition wall element. When the aircraft cabin partition monument is mounted in an aircraft cabin, the first sidewall element may extend to a floor of aircraft cabin so as to support the cover plate element at a desired distance from the floor of the aircraft cabin. In particular, the first sidewall element, in the state of operation of the stowage compartment, may extend substantially parallel to the partition wall element.

The stowage compartment of the aircraft cabin partition monument may comprise the cover plate element and only the first sidewall element, which, preferably together with a portion of the partition wall element, may define the stowage space arranged adjacent to the partition wall element. The stowage space, for example, may be suitable for accommodating at least one trolley, which may be inserted into and removed from the stowage space of the stowage compartment in a direction substantially parallel to the partition wall element. A stowage compartment comprising only a cover plate element and a first sidewall element has a low weight and a particularly small installation volume, i.e., the depth of the aircraft cabin partition monument is not considerably increased by the stowage compartment, when the stowage compartment is in its state of rest.

It is, however, also conceivable that the stowage compartment of the aircraft cabin partition monument comprises a second sidewall element which is pivotably connected to the partition wall element. For example, the second sidewall element may be pivotably connected to the partition wall element by means of a suitable hinge arrangement such that the second sidewall element is pivotable relative to the partition wall element about a pivot axis which extends along an edge of the second sidewall element facing the partition wall element perpendicular to a pivot axis about which the cover plate element is pivotable upon converting the stowage compartment between its state of rest and its state of operation. When the aircraft cabin partition monument is mounted in an aircraft cabin, the pivot axis about which the second sidewall element of the stowage compartment may be pivotable upon converting the stowage compartment between its state of rest and its state of operation may extend substantially perpendicular to the floor of the aircraft cabin.

In the state of rest of the stowage compartment, the second sidewall element, like the first sidewall element, preferably extends substantially parallel to the partition wall element. Further, in the state of rest of the stowage compartment, the second sidewall element may be covered by the cover plate element, i.e., the second sidewall element, in the state of rest of the stowage compartment, may be sandwiched between the partition wall element and the cover plate element. In the state of operation of the stowage compartment, the second sidewall element preferably extends substantially perpendicular to the partition wall element, and preferably also perpendicular to the cover plate element.

In case the stowage compartment comprises a first and a second sidewall element, the first sidewall element, in the state of operation of the stowage compartment, may extend perpendicular to the first sidewall element. For example, the second sidewall element may be combined with a cover plate and a first sidewall element so as to form a stowage compartment, the stowage space of which is limited by the cover plate element, the first sidewall element, the partition wall element and the second sidewall element, i.e., a stowage compartment having three "closed" side surfaces and one "open" side surface via which an item, for example a trolley, can be inserted into and removed from the stowage compartment, preferably in a direction parallel to the partition wall element.

The stowage compartment of the aircraft cabin partition monument may further comprise a third sidewall element which, similar to the second sidewall element, may be pivotably connected to the partition wall element, for example by means of a suitable hinge arrangement. A pivot axis about which the third sidewall element is pivotable upon converting the stowage compartment between its state of rest and its state of operation preferably extends along an edge of the third sidewall element facing the partition wall element and substantially parallel to the pivot axis about which the second sidewall element is pivotable upon converting the stowage compartment between its state of rest and its state of operation. The pivot axis of the third sidewall element thus preferably also extends substantially perpendicular to the floor of the aircraft cabin when the aircraft cabin partition monument is mounted in the aircraft cabin.

In the state of rest of the stowage compartment, the third sidewall element preferably extends substantially parallel to the partition wall element. Further, in the state of rest of the stowage compartment, the third sidewall element may be covered by the cover plate element, i.e., the third sidewall element, in the state of rest of the stowage compartment, may be sandwiched between the partition wall element and the cover plate element. In the state of operation of the stowage compartment, the third sidewall element may extend substantially perpendicular to the partition wall element and, in case the stowage compartment comprises both, a second sidewall element and a third sidewall element, at a distance from the second sidewall element which is defined by a width of the cover plate element.

A stowage compartment which comprises a cover plate element, a second sidewall element and a third sidewall element may be designed without a first sidewall element such that the stowage space of the stowage compartment is limited by the partition wall element, the cover plate element, the second sidewall element and the third sidewall element. Items to be stowed within the stowage compartment, for example a trolley, then may be inserted into and removed from the stowage compartment in a direction substantially perpendicular to the partition wall element.

It is, however, also conceivable that the stowage compartment is provided with a cover plate element, a first sidewall element, a second sidewall element and a third sidewall element. The aircraft cabin partition monument then preferably comprises a partition wall element wherein an access opening is formed which, in the state of operation of the stowage compartment, provides access to the stowage space of the stowage compartment. An item to be stowed within the stowage compartment, for example a trolley, then may be inserted into the stowage compartment, which is limited by the cover plate element, the first sidewall element, the second sidewall element and the third sidewall element, through the partition wall element, i.e., the access opening formed in the partition wall element in a direction substantially perpendicular to the partition wall element.

The stowage compartment of the aircraft cabin partition monument may comprise a fixation mechanism which is adapted to fix an item which, in the state of operation of the stowage compartment, is accommodated within the stowage compartment in place. The fixation mechanism may comprise at least one fixation element which may be attached to an edge of the cover plate element or an edge of a sidewall element of the stowage compartment, or which is attached to an edge of the partition wall element, in particular adjacent to the access opening formed in the partition wall element. The fixation element may be adapted to interact with a surface of the item which extends adjacent to the edge of the cover plate element or the sidewall element of the stowage compartment or adjacent to the edge of the partition wall element to which the fixation element is attached. For example, the fixation element may be adapted to interact with a surface of a trolley accommodated within the stowage compartment so as to secure the trolley in its position within the stowage compartment and to prevent the trolley from rolling out of the stowage compartment.

The stowage compartment of the aircraft cabin partition monument may further comprise a handle which may be arranged on an outer surface of the cover plate element. The term "outer surface" in this context should designate a surface of the cover plate element which is accessible to a user when the stowage compartment is in its state or rest. The handle then may be gripped by the user so as to pivot the cover plate element relative to the partition wall element upon converting the stowage compartment between its state of rest and its state of operation.

The stowage compartment of the aircraft cabin partition monument may comprise a first latching mechanism which is adapted to latch the stowage compartment in its state of rest. For example, the first latching mechanism may comprise at least one latching element which is adapted to interact with the cover plate element and the partition wall element so as to secure the cover plate element to the partition wall element in the state of rest of the stowage compartment. The latching element of the first latching mechanism, however, may also be adapted to interact with a seat rail provided in the floor of the aircraft cabin wherein the aircraft cabin partition monument may be installed. The latching element then, for example, may be arranged in the region of an edge of the cover plate element which faces the floor of the aircraft cabin when the aircraft cabin partition monument is mounted in the aircraft cabin and the stowage compartment is in its state of rest.

Further, the stowage compartment may comprise a second latching mechanism which is adapted to latch the stowage compartment in its state of operation. The second latching mechanism may comprise at least one latching element which is adapted to interact with a seat rail provided in the floor of the aircraft cabin wherein the aircraft cabin partition monument may be installed. The latching element of the second latching mechanism preferably is arranged in the region of an edge of the first, the second and/or the third sidewall element of the stowage compartment which faces a floor of the aircraft cabin when the aircraft cabin partition monument is mounted in the aircraft cabin and the stowage compartment is in its state of operation.

A latching mechanism comprising a latching element which is adapted to interact with a seat rail which may be provided in a cabin floor of the aircraft cabin wherein the aircraft cabin partition monument is mounted makes use of an already existing attachment mechanism and hence eliminates the need to provide an additional attachment arrangement. Further, the latching element may interact with the seat rail at different positions, i.e., a seat rail is not only suitable to interact with both, a latching element of the first latching mechanism and a latching element of the second latching mechanism, but also allows a flexible arrangement of the entire aircraft cabin partition monument at different positions in the aircraft cabin.

In a method of operating an aircraft cabin partition monument as described above, the stowage compartment is converted from its state of rest into its state of operation by moving the cover plate element relative to the partition wall element and by moving the at least one sidewall element relative to the cover plate element and/or the partition wall element until the cover plate element and the sidewall element extend relative to the partition wall element such that the cover plate element and the sidewall element define a stowage space arranged adjacent to the partition wall element. Preferably, the cover plate element is moved relative to the partition wall element before the at least one sidewall element is moved relative to the partition wall element, in particular in case the cover plate element, in the state of rest of the stowage compartment, covers the at least one sidewall element.

Upon converting the stowage compartment between its state of rest and its state of operation, the cover plate element of the stowage compartment may be pivoted relative to the partition wall element, preferably about a pivot axis which extends along an edge of the cover plate element which faces the partition wall element substantially parallel to the partition wall element. Upon converting the stowage compartment from its state of rest into its state of operation, the cover plate element may be pivoted relative to the partition wall element at least until it extends substantially perpendicular to the partition wall element. It is, however, also conceivable that the cover plate element, upon converting the stowage compartment form its state of rest into its state of operation, first is pivoted until the outer surface of the cover plate element forms an acute angle with the partition wall element so as to allow the at least one sidewall element to be pivoted in place before the cover plate then again is lowered relative to the partition wall element so as to finally extend substantially perpendicular to the partition wall element.

Upon converting the stowage compartment between its state of rest and its state of operation, the first sidewall element of the stowage compartment may be pivoted relative to the cover plate element about a pivot axis which extends along an edge of the first sidewall element which faces the cover plate element, i.e., an edge of the cover plate element which faces away from the partition wall element when the stowage compartment is in its state of operation. The pivot axis about which the first sidewall element is pivotable preferably extends substantially parallel to the partition wall element. Upon converting the stowage compartment from its state of rest into its state of operation, the first sidewall element may be pivoted relative to the cover plate element until it extends, in the state of operation of the stowage compartment, substantially perpendicular to the cover plate element and substantially parallel to the partition wall element.

Upon converting the stowage compartment between its state of rest and its state of operation, the second sidewall of the stowage compartment may be pivoted relative to the partition wall element, preferably about a pivot axis which extends along an edge of the second sidewall element which faces the stowage compartment. Upon converting the stowage compartment from its state of rest into its state of operation, the second sidewall element may be pivoted relative to the partition wall element until it extends, in the state of operation of the stowage compartment, substantially perpendicular to the partition wall element and preferably also substantially perpendicular to the cover plate element.

Furthermore, upon converting the stowage compartment between its state of rest and its state of operation, the third sidewall element of the stowage compartment may be pivoted relative to the partition wall, preferably about a pivot axis which extends along an edge of the third sidewall element which faces the partition wall element. Upon converting the stowage compartment from its state of rest into its state of operation, the third sidewall element may be pivoted relative to the partition wall element until it extends, in the state of operation of the stowage compartment, substantially perpendicular to the partition wall element and preferably also substantially perpendicular to the cover plate element.

In the state of operation of the stowage compartment, an item which is accommodated within the stowage compartment may be fixed in place by means of a fixation mechanism. The fixation mechanism may comprise at least one fixation element which is attached to an edge of the cover plate element or an edge of a sidewall element of the stowage compartment, or which is attached to an edge of the partition wall element adjacent to an access opening formed in the partition wall element, and which is adapted to interact with a surface of the item extending adjacent to the edge of the cover plate element or the sidewall element of the stowage compartment or adjacent to the edge of the partition wall element to which the fixation element is attached.

The stowage compartment may be latched in its state of rest by means of a first latching mechanism which in particular comprises at least one latching element which is adapted to interact with the cover plate element and the partition wall element so as to secure the cover plate element to the partition wall element. Further, the stowage compartment may be latched in its state of operation by means of a second latching mechanism which in particular comprises at least one latching element adapted to interact with a seat rail.

An aircraft area according to the invention comprises a first aircraft cabin region which is separated from a second aircraft cabin region by means of an above described aircraft cabin partition monument. The first aircraft area may include a passageway and a galley arranged adjacent to the passageway. In particular, the passageway which may lead to an aircraft door may extend between the galley and the aircraft cabin partition monument. The second aircraft area in particular includes a plurality of passenger seats. The aircraft cabin partition monument then separates a working area of the aircraft cabin from a passenger seat area of the aircraft cabin. The stowage compartment of the aircraft cabin partition monument then in a particularly advantageous manner may be used to accommodate trolleys, since the trolleys are easily accessible by cabin crew members working in the working area, for example for preparing meals to be supplied to the passengers on board the aircraft.

BRIEF DESCRIPTION OF THE DRAWINGS

Preferred embodiments of the invention are now explained in greater detail with reference to the appended schematic drawings, wherein FIG. 1 shows an aircraft area wherein an aircraft cabin partition monument is installed, a stowage compartment of the aircraft cabin partition monument being in a state of rest, FIG. 2 shows the aircraft area according to FIG. 1, wherein, however, the stowage compartment of the aircraft cabin partition monument is in its state of operation, FIG. 3 shows an aircraft area, wherein an aircraft cabin partition monument comprises an alternative embodiment of a stowage compartment, the stowage compartment being arranged in a state of rest, FIG. 4 shows the aircraft area according to FIG. 3, wherein the stowage compartment of the aircraft cabin partition monument is in its state of operation, FIG. 5 shows an aircraft area, wherein an aircraft cabin partition monument comprises a further alternative embodiment of a stowage compartment, the stowage compartment being arranged in its state of operation, and FIGS. 6A and B show alternative possibilities of inserting a trolley into the stowage compartment of the aircraft cabin partition monument installed in the aircraft area according to FIG. 5.

DETAILED DESCRIPTION OF THE PREFERRED EMBODIMENTS

An aircraft area 100 which is depicted in FIGS. 1 and 2 comprises a first aircraft cabin region 102 and a second aircraft cabin region 104. The first aircraft cabin region 102 includes a passageway 106 which extends substantially perpendicular to a main aisle 108 and a longitudinal axis of the aircraft cabin in the direction to an aircraft door (not shown). A galley 110 extends along the passageway 106. Opposite to the galley 110, an aircraft partition monument 10 extends along the passageway 106.

Within the second aircraft cabin region 104, a plurality of passenger seats (not shown) is arranged. The aircraft cabin partition monument 10 thus serves to separate a first aircraft cabin region 102 which is designed as a working area for the cabin crew from a second aircraft cabin region 104 which is designed as a passenger seat receiving region. The aircraft cabin partition monument 10, however, may also be installed at a different position within an aircraft cabin, for example, between a business class cabin region and an economy class cabin region.

The aircraft cabin partition monument 10 comprises a partition wall element 12 which is fixed to a floor 14 of the aircraft cabin and which extends between the main aisle 108 and a sidewall lining 16 of the aircraft cabin. In the embodiment of an aircraft area 100 shown in FIG. 1, the partition wall element 12 of the aircraft cabin partition monument 10 does not extend from the floor 14 up to a ceiling of the aircraft cabin. It is, however, also conceivable to provide the aircraft cabin partition monument 10 with a partition wall 12 which in fact extends from the floor 14 to the ceiling to the aircraft cabin.

The aircraft cabin partition monument 10 further comprises a stowage compartment 18. The stowage compartment 18 is convertible between a stage of rest, shown in FIG. 1, and a state of operation, shown in FIG. 2. In particular, the stowage compartment 18 comprises a cover plate element 20 which is pivotably connected to the partition wall element 12 by a suitable hinge arrangement 22. The cover plate element 20 thus is pivotable relative to the partition wall element 12 about a pivot axis P1 which extends along an edge of the cover plate element 20 along which the cover plate element 20 is attached to the partition wall element 12. Hence, the pivot axis P1 about which the cover plate element 20 is pivotable relative to the partition wall element 12 extends substantially parallel to the floor 14 of the aircraft cabin.

Further, the stowage compartment 18 comprises a first sidewall element 24. As becomes apparent from FIG. 2, the first sidewall element 24 is not directly connected to the partition wall element 12, but pivotably connected to the cover plate element 20. In particular, the first sidewall element 24, by means of a hinge arrangement 26, is pivotably connected to an edge of the cover plate element 20 which, in the state of operation of the stowage compartment 18 according to FIG. 2, faces away from the partition wall element 12. The first sidewall element 24 thus is pivotable relative to the cover plate element 20 about a pivot axis P2 which extends substantially parallel to the pivot axis P1 of the cover plate element 20 and hence, like the pivot axis P1 of the cover plate element 20, substantially parallel to the floor 14 of the aircraft cabin.

When the stowage compartment 18 is in its state of rest as shown in FIG. 1, both the cover plate element 20 and the first sidewall element 24 extend substantially parallel to the partition wall element 12, wherein the cover plate element 20 covers the first sidewall element 24 such that the first sidewall element 24 is sandwiched between the first wall element 12 and the cover plate element 20. To the contrary, in the state of operation of the stowage compartment 18 according to FIG. 2, the cover plate element 20 and the first sidewall element 24 extend relative to the partition wall element 14 such that the cover plate element 20 and the first sidewall element 24 define a stowage space arranged adjacent to the partition wall element 12.

In particular, in the embodiment of an aircraft cabin partition monument 10 according to FIGS. 1 and 2, the cover plate element 20, which, in the state of operation of the stowage compartment 18, extends substantially perpendicular to the partition wall element 12 and substantially parallel to the floor 14 of the aircraft cabin, and the first sidewall element 24 which, in the state of operation of the stowage compartment 18, extends substantially perpendicular to the cover plate element 20 and the floor 14 of the aircraft cabin and substantially parallel to the partition wall element 12 define a substantially cuboid-shaped stowage space. The stowage compartment 18 thus is particularly suitable for accommodating a pair of trolleys 28 which may be loaded with items to be supplied to passengers on board the aircraft.

The stowage space provided by the stowage compartment 18 in its state of operation thus is limited by the partition wall element 12, the cover plate element 20 and the first sidewall element 24. Hence, the stowage compartment 18 is provided with two "open" surfaces, one facing the sidewall lining 16 of the aircraft cabin and one facing the main aisle 108. Via the "open" surface of the stowage compartment 18 which faces the main aisle 108, the trolleys 28 may comfortably be inserted into the stowage compartment 18 and removed from the stowage compartment 18 in a direction D substantially parallel to the partition wall element 12.

The stowage compartment 18 integrated into the aircraft cabin partition monument 10 further comprises a handle 30 which is attached to an outer surface of the cover plate element 20 close to an edge of the cover plate element 20 which, in the state of rest of the stowage compartment 18, faces the floor 14 of the aircraft cabin. The handle 30 may be gripped by a user upon converting the stowage compartment 18 between its state of rest and its state of operation.

As depicted in FIG. 1, the stowage compartment 18 further comprises a first latching mechanism 32 which serves to latch the stowage compartment 18 in its state of rest. The first latching mechanism 32 comprises two latching elements 34a, 34b which, in the state of rest of the stowage compartment 18, interact with the cover plate element 20 and the partition wall element 12 so as to secure the cover plate element 20 and hence also the first sidewall element 24 to the partition wall element 12. Further, the stowage compartment 18 comprises a second latching mechanism 36 which is adapted to latch the stowage compartment 18 in its state of operation. The second latching mechanism 36 comprises a latching element 38a which is attached to an edge of the first sidewall element 24 which, in the state of operation of the stowage compartment 18, faces the floor 14 of the aircraft cabin. The latching element 38a is adapted to interact with a seat rail 40a provided in the floor 14, see FIG. 2.

Further, the stowage compartment 18 is provided with a fixation mechanism 42 which is adapted to fix an item, which, in the state of operation of the stowage compartment 18, is accommodated within the stowage compartment 18 in place.

In the arrangement according to FIGS. 1 and 2, the fixation mechanism 42 comprises two fixation elements 44a, 44b which are attached to an edge of the cover plate 20 which faces the main aisle 8. Further, the fixation mechanism 42 comprises two fixation elements which are not shown in the drawings, but which are attached to an edge of the cover plate element 20 which faces the sidewall lining 16. The fixation elements 44a, 44b of the fixation mechanism 42 are adapted to interact with a surface of the trolleys 28 so as to secure the trolleys 28 in their position in the stowage compartment, i.e., to prevent the trolleys 28 from exiting the storage compartment 18, for example, during take-off or during landing of the aircraft or in case of turbulences occurring during the flight.

In order to convert the storage compartment 18 from its state of rest according to FIG. 1 into its state of operation according to FIG. 2, a user may unlatch the latching elements 34a, 34b of the first latching mechanism 32 and thereafter may pivot the cover plate element 20 relative to the partition wall element 12 about the pivot axis P1 in the direction of an arrow A1 shown in FIG. 2. During pivoting of the cover plate element 20, the first sidewall element 24 is held parallel to the cover plate element 20. Only in a second step, the first sidewall element 24 is pivoted relative to the cover plate element 20 about the pivot axis P2 in a direction of an arrow A2 as shown in FIG. 2. The stowage compartment 18 then is latched in its state of operation by bringing the latching element 38a of the second latching mechanism 36 into engagement with the seat rail 40a. Finally, the trolleys 28 may be inserted into the stowage compartment 18 and secured in place by means of the fixation elements 44a, 44b of the fixation mechanism 42.

In order to convert the stowage compartment 18 from its state of operation to its state of rest after the trolleys 28 have been removed from the stowage compartment 18, first, the latching element 38a of the second latching mechanism 36 is released from the seat rail 40a. Thereafter, the first sidewall element 24 is pivoted about the pivot axis P2 opposite to the direction A2 indicated in FIG. 2 so as to again extend parallel to the cover plate 20. Thereafter, the cover plate element 20, with the first sidewall element 24 held parallel to the cover plate element 20, is pivoted about the pivot axis P1 opposite to the direction A1 indicated in FIG. 2 so as to again align the cover plate element 20 and the first sidewall element 24 in parallel to the partition wall element 12. Finally, the cover plate element 20 and the first sidewall element 24 are secured to the partition wall element 12 by means of the latching elements 34a, 34b of the first latching mechanism 32.

An aircraft area 100 depicted in FIGS. 3 and 4 differs from the arrangement according to FIGS. 1 and 2 in that the aircraft cabin partition monument 10 is equipped with an alternative embodiment of a stowage compartment 18. The stowage compartment 18 of the aircraft cabin partition monument 10 according to FIGS. 3 and 4 comprises a cover plate element 20. The first sidewall element 24 of the stowage compartment 18 according to FIGS. 1 and 2, however, is omitted. Instead, the stowage compartment 18 comprises a second sidewall element 26 which, like the first sidewall element 24 in the arrangement according to FIGS. 1 and 2, in the state of rest of the stowage compartment 18 is arranged parallel to the partition wall element 12 and covered by the cover plate element 20, i.e., sandwiched between the partition wall element 12 and the cover plate element 20. Further, a third sidewall element 48 is provided which, in the state of rest of the stowage compartment 18, also extends substantially parallel to the partition wall element 12 and is covered by the cover plate element 20, i.e., is sandwiched between the partition wall element 12 and the cover plate element 20.

In the state of operation of the stowage compartment 18 depicted in FIG. 4, the second sidewall element 46 faces the main aisle 108 and extends substantially perpendicular to both the cover plate element 20 and the partition wall element 12. The third sidewall element 48 faces the sidewall lining 16 and also extends substantially perpendicular to the cover plate element 20 and the partition wall element 12. In addition, the second and the third sidewall element 46, 48 extend substantially parallel to each other.

The second sidewall element 46 is pivotably connected to the partition wall element 12 by means of a hinge arrangement 50. The hinge arrangement 50 allows the second sidewall element 46 to be pivoted relative to the partition wall element 12 about a pivot axis P3. Similarly, the third sidewall element 48 is pivotably connected to the partition wall element 12 by means of a hinge arrangement 52. The hinge arrangement 52 allows the third sidewall element 48 to be pivoted relative to the partition wall element 12 about a pivot axis P4.

The stowage compartment 18 according to FIGS. 3 and 4 thus provides a stowage space which is defined by the partition wall element 12, the cover plate element 20, the second sidewall element 46 and the third sidewall element 48. The stowage space of the stowage compartment 18 is accessible via an "open" surface of the stowage compartment 18 which is arranged parallel to the partition wall 12. Via the "open" surface, trolleys 28 may be inserted into the stowage compartment 18 removed out of the stowage compartment 18 in a direction D substantially perpendicular to the partition wall element 12.

The fixation mechanism 42 of the stowage compartment 18 according to FIGS. 3 and 4 comprises three fixation elements 44a, 44b, 44c. The fixation elements 44a, 44b, 44c are attached to an edge of the cover plate element 20 which, in the state of operation of the stowage compartment 18, faces away from the partition wall element 12.

The stowage compartment 18 is latched into its state of operation by means of a second operation mechanism 36 which comprises latching elements 38a attached to the second sidewall element 46 and the third sidewall element 48. In particular, the latching elements 38a are attached to an edge of the second sidewall element 46 and the third sidewall element 48, respectively, which, in the state of operation of the stowage compartment 18 faces the floor 14 of the aircraft cabin. Thus, the latching elements 38a can be brought into engagement with seat rails 40a, 40b in order to secure the stowage compartment 18 in its state of operation.

Upon converting the stowage compartment 18 from its state of rest into its state of operation, after pivoting the cover plate element 20 about the pivot axis P1 until the cover plate element 20 extends substantially perpendicular to the partition wall element 12, the second sidewall element 46 is pivoted relative to the partition wall element 12 about the pivot axis P3 in the direction of an arrow A3, see FIG. 4. The third sidewall element 48 is pivoted relative to the partition wall element 12 about the pivot axis P4 in the direction of an arrow A4, see FIG. 4. Upon converting the stowage compartment 18 from its state of operation into its state of rest, the second sidewall element 46 is pivoted relative to the partition wall element 12 about the pivot axis P4 opposite to the direction A4, and the third sidewall element 48 is pivoted relative to the partition wall element 12 about the pivot axis P4 opposite to the direction A4.

Otherwise, the structure and the function of the stowage compartment 18 integrated into the aircraft cabin partition monument 10 according to FIGS. 3 and 4 correspond to the structure and the function of the stowage compartment 18 of the aircraft cabin partition monument 10 according to FIGS. 1 and 2.

FIG. 5 shows an aircraft area 100 which is equipped with an aircraft cabin partition monument 10 comprising a further alternative embodiment of a stowage compartment 18. The stowage compartment 18 of the aircraft cabin partition monument 10 according to FIG. 5 differs from the arrangement according to FIGS. 3 and 4 in that the stowage compartment 18 no longer comprises an "open" surface arranged substantially parallel to the partition wall element 12. Instead, the stowage compartment 18, similar to the stowage compartment 18 according to FIGS. 1 and 3, comprises a first sidewall element 24 which, in the state of operation of the stowage compartment 18, extends substantially perpendicular to the cover plate element 20, the second sidewall element 46 and the third sidewall element 48 and substantially parallel to the partition wall element 12.

In order to allow a trolley 28 to be inserted into the stowage space provided by the stowage compartment 18 and in order to allow the trolley 28 to be again removed from the stowage space provided by the stowage compartment 18, the partition wall element 12 is provided with an access opening 54. As shown in FIGS. 6A and 6B, the access opening 54 is formed in the partition wall element 12 so as to extend parallel to the first sidewall element 24. As becomes apparent from FIGS. 6A and 6B, trolleys 28 may be inserted into the stowage compartment 18 via the access opening 54 either lengthwise, see FIG. 6A or in a transverse orientation, see FIG. 6B. In any case, the trolleys 28 are moved in a direction D substantially perpendicular to the partition wall element 12 upon insertion into and upon removal from the stowage compartment 18. The fixation elements 44a, 44b which, in the arrangement according to FIGS. 5, 6A and 6B serve to secure the trolleys 28 in place within the stowage compartment 18 are attached to the partition wall element 12 in the region of an edge of the partition wall element 12 adjacent to the access opening 54.

Otherwise, the structure and the function of the stowage compartment 18 provided in the aircraft cabin partition monument 10 according to FIGS. 5, 6A and 6B correspond to the structure and the function of the stowage compartment 18 provided in the aircraft cabin partition monument 10 according to FIGS. 3 and 4.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cabin partition monument comprising:
a partition wall element, and
a stowage compartment,
the stowage compartment comprising a cover plate element and at least one sidewall element,
the stowage compartment being convertible between a state of rest, wherein the cover plate element and the sidewall element extend substantially parallel to the partition wall element, and a state of operation, wherein the cover plate element and the sidewall element extend relative to the partition wall element such that the cover plate element and the sidewall element define a stowage space arranged adjacent to the partition wall element, wherein the stowage compartment, in its state of operation, includes at least one trolley.

2. The aircraft cabin partition monument according to claim 1, wherein the cover plate element of the stowage compartment is pivotably connected to the partition wall element and, in the state of operation of the stowage compartment, extends substantially perpendicular to the partition wall element.

3. The aircraft cabin partition monument according to claim 1, wherein a first sidewall element of the stowage compartment is pivotably connected to the cover plate element and, in the state of operation of the stowage compartment, extends substantially perpendicular to the cover plate element and substantially parallel to the partition wall element.

4. The aircraft cabin partition monument according to claim 1, wherein a second sidewall element of the stowage compartment is pivotably connected to the partition wall element which, in the state of operation of the stowage compartment, extends substantially perpendicular to the partition wall element.

5. The aircraft cabin partition monument according to claim 1, wherein a third sidewall element of the stowage compartment is pivotably connected to the partition wall element which, in the state of operation of the stowage compartment, extends substantially perpendicular to the partition wall element.

6. The aircraft cabin partition monument according to claim 1, wherein an access opening which, in the state of operation of the stowage compartment, provides access to an interior of the stowage compartment is formed in the partition wall element.

7. The aircraft cabin partition monument according to claim 1, wherein the stowage compartment comprises a fixation mechanism which is adapted to fix an item which, in the state of operation of the stowage compartment, is accommodated within the stowage compartment in place, the fixation mechanism in particular comprising at least one fixation element, which is attached to an edge of the cover plate element or an edge of a sidewall element of the stowage compartment, or which is attached to an edge of the partition wall element adjacent to an access opening formed in the partition wall element, and which is adapted to interact with a surface of the item which extends adjacent to the edge of the cover plate element or the sidewall element of the stowage compartment or adjacent to the edge of the partition wall element to which the fixation element is attached.

8. The aircraft cabin partition monument according to claim 1, wherein the stowage compartment comprises a handle arranged on an outer surface of the cover plate element.

9. The aircraft cabin partition monument according to claim 1, wherein the stowage compartment comprises a first latching mechanism which is adapted to latch the stowage compartment in its state of rest, the first latching mechanism in particular comprising at least one latching element which is adapted to interact with the cover plate element and the partition wall element.

10. The aircraft cabin partition monument according to claim 1, wherein the stowage compartment comprises a second latching mechanism which is adapted to latch the stowage compartment in its state of operation, the second latching mechanism in particular comprising at least one latching element which is adapted to interact with a seat rail.

11. A method of operating the aircraft cabin partition monument according to claim 1, comprising the steps of:

converting the stowage compartment from its state of rest into its state of operation by
  moving the cover plate element relative to at least one of the partition wall element and by
  moving the at least one sidewall element relative to the cover plate element and the partition wall element until the cover plate element and the sidewall element extend relative to the partition wall element such that the cover plate element and the sidewall element define a stowage space arranged adjacent to the partition wall element.

12. The method according to claim 11, wherein the cover plate element of the stowage compartment is pivoted relative to the partition wall element at least until it extends, in the state of operation of the stowage compartment, substantially perpendicular to the partition wall element.

13. The method according to claim 11, wherein the first sidewall element of the stowage compartment is pivoted relative to the cover plate element until it extends, in the state of operation of the stowage compartment, substantially perpendicular to the cover plate element and substantially parallel to the partition wall element.

14. The method according to claim 11, wherein the second sidewall element of the stowage compartment is pivoted relative to the partition wall element until it extends, in the state of operation of the stowage compartment, substantially perpendicular to the partition wall element.

15. The method according to claim 11, wherein the third sidewall element of the stowage compartment is pivoted relative to the partition wall element until it extends, in the state of operation of the stowage compartment, substantially perpendicular to the partition wall element.

16. The method according to claim 11, wherein, in the state of operation of the stowage compartment, an item which is accommodated within the stowage compartment is fixed in place by means of a fixation mechanism, the fixation mechanism in particular comprising at least one fixation element which is attached to an edge of the cover plate element or an edge of a sidewall element of the stowage compartment, or which is attached to an edge of the partition wall element adjacent to an access opening formed in the partition wall element, and which is adapted to interact with a surface of the item extending adjacent to the edge of the cover plate element or the sidewall element of the stowage compartment or adjacent to the edge of the partition wall element to which the fixation element is attached.

17. The method according to claim 11, wherein the stowage compartment is latched in its state of rest by means of a first latching mechanism which in particular comprises at least one latching element adapted to interact with the cover plate element and the partition wall element.

18. The method according to claim 11, wherein the stowage compartment is latched in its state of operation by means of a second latching mechanism which in particular comprises at least one latching element adapted to interact with a seat rail.

19. An aircraft area comprising a first aircraft cabin region which is separated from a second aircraft cabin region by means of an aircraft cabin partition monument according to claim 1, wherein the first aircraft cabin region includes a passageway and a galley arranged adjacent to the passageway, and wherein the second aircraft cabin region includes a plurality of passenger seats.

* * * * *